US009729910B2

(12) United States Patent
Lind et al.

(10) Patent No.: US 9,729,910 B2
(45) Date of Patent: Aug. 8, 2017

(54) ADVERTISEMENT SELECTION BASED ON DEMOGRAPHIC INFORMATION INFERRED FROM MEDIA ITEM PREFERENCES

(71) Applicant: Pandora Media, Inc., Oakland, CA (US)

(72) Inventors: Kyle George Lind, Lafayette, CA (US); Tao Ye, Daly City, CA (US)

(73) Assignee: PANDORA MEDIA, INC., Oakland, CA (US)

( * ) Notice: Subject to any disclaimer, the term of this patent is extended or adjusted under 35 U.S.C. 154(b) by 0 days.

(21) Appl. No.: 14/495,534

(22) Filed: Sep. 24, 2014

(65) Prior Publication Data

US 2016/0088332 A1     Mar. 24, 2016

(51) Int. Cl.
*H04N 21/25* (2011.01)
*H04N 21/2668* (2011.01)
*H04N 21/258* (2011.01)
*H04N 21/442* (2011.01)
(Continued)

(52) U.S. Cl.
CPC ....... *H04N 21/2668* (2013.01); *H04N 21/252* (2013.01); *H04N 21/25883* (2013.01); *H04N 21/25891* (2013.01); *H04N 21/44222* (2013.01); *H04N 21/812* (2013.01); *H04N 21/8113* (2013.01); *H04N 21/222* (2013.01)

(58) Field of Classification Search
CPC ............ H04N 21/2668; H04N 21/252; H04N 21/25883; H04N 21/25841; H04N 21/44222
See application file for complete search history.

(56) References Cited

U.S. PATENT DOCUMENTS

| 7,075,000 B2 | 7/2006 | Gang et al. |
| 7,102,067 B2 | 9/2006 | Gang et al. |
| 8,281,037 B2 | 10/2012 | Julia et al. |

(Continued)

FOREIGN PATENT DOCUMENTS

| JP | 2006-146630 A | 6/2006 |
| KR | 10-2013-0139228 A | 12/2013 |
| WO | WO 2009-090358 | 7/2009 |

OTHER PUBLICATIONS

PCT International Search Report for Written Opinion for PCT/US2015/052702, Dec. 29, 2015, 10 Pages.

(Continued)

*Primary Examiner* — Brian T Pendleton
*Assistant Examiner* — Frank Johnson-Calderon
(74) *Attorney, Agent, or Firm* — Fenwick & West LLP

(57) ABSTRACT

A content server monitors media preferences of a user associated with a partial user profile specifying partial demographic information about the user. The content server deconstructs the monitored media preferences to identify preferences of the user for musicological features of the media items. The content server infers profile information missing from the partial user profile responsive to the preferences of the user for musicological features of the media items, the inferring using baseline information associating profile information of a plurality of baseline users with preferences for musicological features of media items. The content server selects an advertisement using the inferred profile information, and provides the selected advertisement to a client device used by the user.

17 Claims, 5 Drawing Sheets

(51) Int. Cl.
*H04N 21/81* (2011.01)
*H04N 21/222* (2011.01)

(56) References Cited

U.S. PATENT DOCUMENTS

| | | | |
|---|---|---|---|
| 8,352,319 | B2 | 1/2013 | Wang et al. |
| 8,494,897 | B1* | 7/2013 | Dawson ................. G06Q 10/10 |
| | | | 705/14.42 |
| 8,910,195 | B1* | 12/2014 | Barney ............ H04N 21/44213 |
| | | | 725/14 |
| 9,600,561 | B2* | 3/2017 | Bhargava .......... G06F 17/30598 |
| 2006/0156326 | A1* | 7/2006 | Goronzy ........... G06F 17/30035 |
| | | | 725/13 |
| 2007/0180469 | A1 | 8/2007 | Finley et al. |
| 2008/0301732 | A1 | 12/2008 | Archer et al. |
| 2010/0312609 | A1 | 12/2010 | Epshtein et al. |
| 2011/0276374 | A1* | 11/2011 | Heiser, II .......... G06F 17/30867 |
| | | | 705/14.13 |
| 2011/0282964 | A1 | 11/2011 | Krishnaswamy et al. |
| 2011/0295843 | A1 | 12/2011 | Ingrassia et al. |
| 2012/0041969 | A1* | 2/2012 | Priyadarshan ......... G06Q 30/02 |
| | | | 707/769 |
| 2012/0054205 | A1* | 3/2012 | Baluja ..................... G06N 5/02 |
| | | | 707/749 |
| 2012/0054302 | A1* | 3/2012 | Priyadarshan ......... G06Q 30/02 |
| | | | 709/217 |
| 2012/0191844 | A1 | 7/2012 | Boyns et al. |
| 2013/0121503 | A1 | 5/2013 | Ankelekar et al. |
| 2014/0074861 | A1 | 3/2014 | Bieschke et al. |
| 2014/0180762 | A1* | 6/2014 | Gilbert ................... G06Q 30/02 |
| | | | 705/7.29 |
| 2014/0279722 | A1* | 9/2014 | Singh ................ G06F 17/30702 |
| | | | 706/11 |
| 2014/0316934 | A1 | 10/2014 | Villegas |
| | | | Nunez ............ G06Q 10/06393 |
| | | | 705/26.7 |
| 2015/0026708 | A1* | 1/2015 | Ahmed ............... H04N 5/23206 |
| | | | 725/12 |
| 2015/0220525 | A1 | 8/2015 | Ross et al. |

OTHER PUBLICATIONS

PCT International Search Report for Written Opinion for PCT/US2015/052037, Jan. 7, 2016, 10 Pages.

* cited by examiner

ADVERTISEMENT SELECTION BASED ON DEMOGRAPHIC INFORMATION INFERRED FROM MEDIA ITEM PREFERENCES

BACKGROUND

Field of Disclosure

The present invention generally relates to the delivery of content, and more specifically, to ways of selecting advertisements for presentation to a user based on demographic information inferred from the user's media item preferences.

Description of the Related Art

Providers of digital content sometimes provide anonymous or semi-anonymous access to their services. Anonymous access allows a user to receive digital content without having to provide any personal identifying information to the provider of the digital content. Similarly, semi-anonymous access allows a user to receive digital content in exchange for providing limited information about that user. Providers of digital content often want to embed advertisements into the content being presented. But, it is problematic to target advertisements to users that are receiving access to the content in an anonymous or semi-anonymous manner as there is little information known about such users.

SUMMARY

The above and other needs are met by a computer-implemented method, a non-transitory computer-readable storage medium storing executable code, and a system for advertisement selection based on demographic information inferred from media item preferences.

One embodiment of the computer-implemented method for advertisement selection based on demographic information inferred from media item preferences, comprises monitoring media preferences of a user associated with a partial user profile specifying partial demographic information about the user. The monitored media preferences are deconstructed to identify preferences of the user for musicological features of the media items. Profile information missing from the partial user profile is inferred responsive to the preferences of the user for musicological features of the media items, the inferring using baseline information associating profile information of a plurality of baseline users with preferences for musicological features of media items. An advertisement is selected using the inferred profile information, and provided to a client device used by the user.

One embodiment of a non-transitory computer-readable storage medium storing executable computer program instructions for advertisement selection based on demographic information inferred from media item preferences, comprises monitoring media preferences of a user associated with a partial user profile specifying partial demographic information about the user. The monitored media preferences are deconstructed to identify preferences of the user for musicological features of the media items. Profile information missing from the partial user profile is inferred responsive to the preferences of the user for musicological features of the media items, the inferring using baseline information associating profile information of a plurality of baseline users with preferences for musicological features of media items. An advertisement is selected using the inferred profile information, and provided to a client device used by the user.

One embodiment of a device for advertisement selection based on demographic information inferred from media item preferences, comprises a processor configured to execute modules, and a memory storing the modules. The modules include a monitoring module configured to monitor media preferences of a user associated with a partial user profile specifying partial demographic information about the user. The modules further include a deconstruction module configured to deconstruct the monitored media preferences to identify preferences of the user for musicological features of the media items. The modules further include an inference module configured to infer profile information missing from the partial user profile responsive to the preferences of the user for musicological features of the media items, the inferring using baseline information associating profile information of a plurality of baseline users with preferences for musicological features of media items. The module further include a content selection module configured to select an advertisement using the inferred profile information, and an advertisement server module configured to provide the selected advertisement to a client device used by the user.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
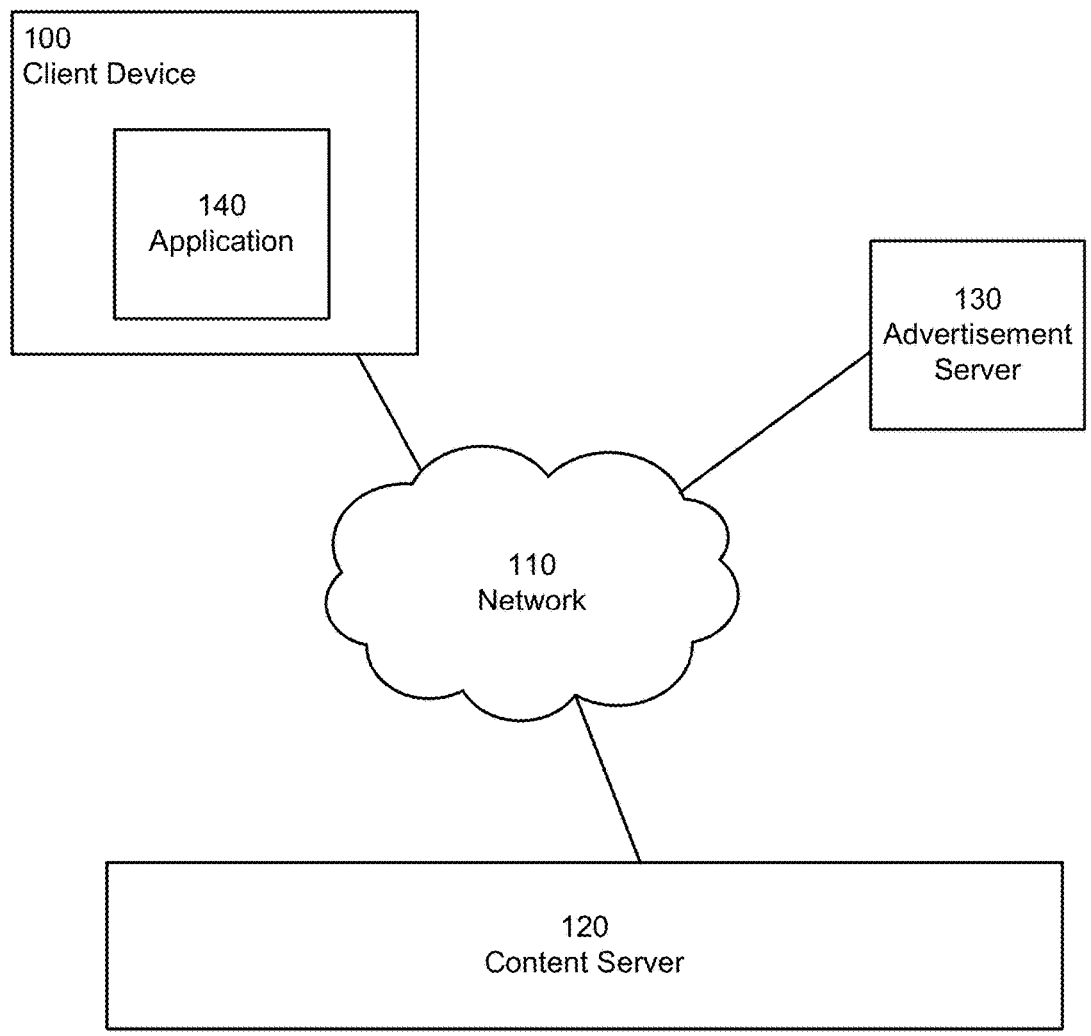
FIG. 1 is a high-level block diagram illustrating an embodiment of an environment for advertisement selection based on demographic information inferred from media item preferences.

FIG. 1 is a high-level block diagram illustrating an embodiment of an environment for advertisement selection based on demographic information inferred from media item preferences. The environment includes a client device 100 connected by a network 110 to a content server 120 and an advertisement server 130. Here only one client device 100, advertisement server 130, and content server 120 are illustrated but there may be multiple instances of each of these entities. For example, there may be thousands or millions of client devices 100 in communication with one or more content servers 120 and advertisement servers 130.

The network 110 provides a communication infrastructure between the client devices 100, the advertisement servers 130, and the content servers 120. The network 110 is typically the Internet, but may be any network, including but not limited to a Local Area Network (LAN), a Metropolitan Area Network (MAN), a Wide Area Network (WAN), a mobile wired or wireless network, a private network, or a virtual private network.

The advertisement server 130 provides advertisements to the client devices 100 and/or the content server 120 in accordance with requests for advertisements received from the content server. The advertisement server 130 receives candidate advertisements from various advertisers and, in some embodiments, the content server 120. Responsive to receiving a request for an advertisement, the advertisement server 130 selects (e.g., via an auction) an advertisement to provide to the client device 100 from a group of candidate advertisements. The advertising server 130 may provide the selected advertisement to the client device 100, the content server 120, or some other entity who then serves the advertisement to the client device 100. In alternate embodiments, the advertising server 130 may select the advertisement from a group of candidate advertisements, and then send a request to some other entity to provide the advertisement to the client device 100.

The client devices 100 are computing devices that execute computer program modules—e.g., a web browser or other client application—which allow a user to view consume media content. The client devices 100 are computing devices such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices 100 include the hardware and software needed to input and output sound (e.g., speakers and microphone) and images, connect to the network 110 (e.g., via Wifi and/or 4G or other wireless telecommunication standards), determine the current geographic location of the client devices 100 (e.g., a Global Positioning System (GPS) unit), and/or detect motion of the client devices 100 (e.g., via motion sensors such as accelerometers and gyroscopes).

The client device 100 includes an application 140 that allows interaction with the content server 120. For example, the application 140 could be a browser that allows a user of the client device 100 to obtain content by browsing a web site of the content server 120. As another example, the application 140 could be a dedicated application specifically designed (e.g., by the organization responsible for the content server 120) to enable interactions with the content server 120 and its content.

The application 140 requests content from the content server 120, and presents the received content to a user of the client device 100. The content may include media items, advertisements, or both. A media item is some form of media content. In one particular embodiment referred to throughout the remainder of the specification, the media item is audio content, such as a song, piece of music, or audio recording. It is appreciated, however, that in other embodiments a media item may be another form of digital content, such as a video, movie, slideshow, or image. Thus, subsequent references to the media item or other audio-related terminology could equally apply to (for example) viewing videos or otherwise experiencing media provided by the content server system 100. Additionally, a media item is characterized by a plurality of media features that describe musicological attributes of the media (e.g., gender of lead vocalist, level of distortion on the electrical guitar, etc.).

A user may interact with the content server via the client device 100 as a semi-anonymous user or a baseline user. A semi-anonymous user is a user who provides a limited set of demographic information describing the user that does not directly identify the user in exchange for access to content from the content server 120. A limited set of demographic information may be, e.g., age of the user, gender of the user, and a home location (e.g., zip code) of the user, and this would be the only types demographic information provided by the user in exchange for access to content provided by the content server 120. Additionally, in some embodiments, a user may be fully anonymous. A fully-anonymous user is a user that has not provided any demographic information to the content server 120 and is able to receive content from the content server 120.

A baseline user is a user who provides an expanded set of demographic information to the content server. An expanded set of demographic information includes the limited set of demographic information plus additional types of demographic information describing the user. Expanded demographic information may include, for example, age, gender, zip code, income, education level, profession, ethnicity, number of dependents, age of dependents, and other demographic information. Additionally, in some embodiments, the expanded demographic information may include information that directly identifies a user (e.g., a name, home address, etc.).

The content server 120 infers demographic information for semi-anonymous users from the demographic information of baseline users based on the two types of users' media item preferences. The inferred demographic information, along with the known demographic information, are stored in profiles associated with the users. Thus, the content server infers profile information for the semi-anonymous users. The inferred profile information allows the content server 120 to better target advertisements to the semi-anonymous users.

The content server 120 monitors media preferences of its users (e.g., the semi-anonymous and baseline users). The media preferences indicate whether the users like or dislike specific media items and types of media items. The content server 120 monitors media preferences of the users by tracking types of media items requested by the users, media items presented to the users, and feedback (e.g., thumbs up, thumbs down, ratings of media items) received from the users in response to the presented media items. Collectively, the monitored preferences describe the media items preferred by the users, and identify specific media items preferred by the users.

In one embodiment, the content server 120 further uses the monitored media items to identify media features preferred by the users. The content server 120 determines the media items preferred by a given user, and deconstructs these media items into media features into a set of features that describe the musicological attributes of the media items. The preferences of the user are thus described by a set of media features (also referred to as musicological features).

The content server 120 identifies correlations between musicological media features and profile information (i.e., demographic information) and uses the identified correlations to infer profile information for semi-anonymous users. In one embodiment, the content server 120 determines correlations between the demographic information of the baseline users with the users' preferred media features. For example, the content server 120 may learn that male users with annual incomes within a specified range that live in the southern U.S. have preferences for musicological features found in country music, while male users with annual incomes within a different range that also live in the southern U.S. have preferences for musicological features found in classical music. The content server 120 thus identifies a correlation between annual income and musicological features.

The content server 120 uses the identified correlations to infer profile information for semi-anonymous users based on these users' preferred media features. For example, the content server 120 may monitor media preferences of a semi-anonymous user to determine that the semi-anonymous user tends to prefer media having musicological features in common with classical music. If the profile information of the monitored semi-anonymous user indicates that the user lives in the southern U.S., the content server 120 may infer that the semi-anonymous user has an income within the range identified with respect to the baseline users. The content server 120, accordingly, augments the limited user profile associated with the semi-anonymous user with some or all of the inferred demographic information. Therefore, the content server 120 establishes a larger set of expanded demographic information for the semi-anonymous user. Accordingly, the content server's 120 ability to effectively target advertisements to the semi-anonymous user is increased, as the content server 120 is able to target advertisements based on the inferred information.

The content server 120 maintains candidate advertisements which may be provided to the client devices 100. The candidate advertisements may include targeting information that specifies one or more demographics of users eligible to be presented with the advertisements. The candidate advertisements may be generated by the content server 120, received from various advertisers, or some combination thereof.

The content server 120 receives requests for content from the client devices 100. For example, the content server 120 may receive a request from a client device 100 associated with a semi-anonymous user to provide a media item to the client device 100. The content server 120 provides the requested media item and identifies an opportunity to provide an advertisement to the client device 100. The content server 120 selects an advertisement, from the candidate advertisements, using the inferred profile information for the semi-anonymous user and the targeting information of the candidate advertisements. In some embodiments, the content server 120 provides the selected advertisement to the client device 100. In other embodiments, the content server 120 provides the selected advertisement to the advertisement server 130, which conducts an auction including the selected advertisement, and may provide the selected advertisement to the client device 100 if the selected advertisement wins the auction.

The content server 120 effectively targets advertisements to semi-anonymous users. The content server 120 is able to infer demographic information about a semi-anonymous user by identifying preferred media features of media items that are similar to those of a group of baseline users—and then inferring that the demographic information of the semi-anonymous users is similar to that of the group of baseline users. The inferred profile information provides the content server 120 with information that can be used to better target advertisements to semi-anonymous users. Moreover, it is appreciated that the same methods of inferring profile information for semi-anonymous users may also be used to infer profile information for fully-anonymous users.

Figure 2:
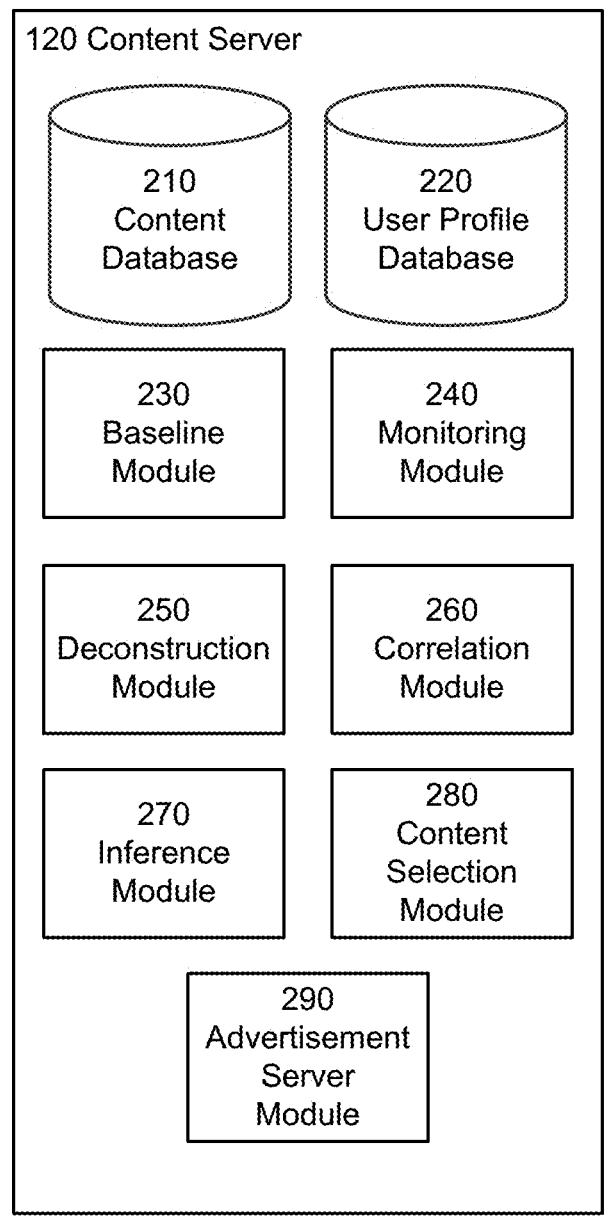
FIG. 2 is a high-level block diagram illustrating a detailed view of the content server of FIG. 1, according to one embodiment.

Turning now to a discussion of the structure of the content server 120, FIG. 2 is a high-level block diagram illustrating a detailed view of modules within the content server 120 according to one embodiment. Some embodiments of the content server 120 have different modules than those described here. Similarly, the functions can be distributed among the modules in a different manner than is described here. The content server 120 is comprised of modules including a content database 210, a user profile database 220, a baseline module 230, a monitoring module 240, a deconstruction module 250, a correlation module 260, an inference module 270, a content selection module 280, and an advertisement server module 290.

The content database 210 stores information relating to content that can be provided to the client devices 100. Information relating to content includes media items and associated metadata describing the media items (e.g., name of artist, name of album, etc.), media item playlists associated with different media channels, candidate advertisements, and mappings of media items to media features. As mentioned above, a media feature describes musicological characteristics of media items. For example, if the media item is a song, the media features of the song may indicate the underlying characteristics of the song such as the gender of the singer, the type of background vocals, the tempo, the quality of the tones (e.g., pure or distorted), whether the melody dominates the composition, and an amount of gospel influence. A given media item may have many media features, such as 100-500 media features. In one embodiment, the mapping of media items to media features is established using the MUSIC GENOME PROJECT database created by PANDORA MEDIA, INC. of Oakland, Calif.

An advertisement is a notification regarding a particular good and/or service. An advertisement may have audio content, image content, video content, or some combination thereof. The advertisements may include targeting information. The targeting information specifies one or more demographics of users to whom the advertisement is directed. Targeting information may indicate, e.g., a preferred age, gender, income level, political affiliation, location of user, location of a user's home, location of a user's work address, interests (e.g., hunting, camping, running, etc.), education, being a parent, an/or relationship status (e.g., married, single) of the recipients of the advertisements. Collectively, the pool of advertisements form a set of candidate advertisements.

The user profile database 220 stores user profile information describing demographic information for users of the content server 120. The user profile database 220 stores partial user profiles associated with semi-anonymous users and expanded user profiles associated with baseline users. A partial user profile includes a limited set of demographic information associated with a semi-anonymous user, and may additionally include inferred profile information. An expanded user profile includes an expanded set of demographic information associated with a baseline user (e.g., an expanded user profile includes additional demographic information that is known about the baseline user beyond the limited set of demographic information known for a semi-anonymous user).

The baseline module 230 establishes a set of users as baseline users. The baseline module 230 queries users to provide additional demographic information beyond the limited set of demographic information such that an expanded set of demographic information may be obtained for the queried user. The option to provide additional demographic information may be provided, e.g., at login to the content server 120, at the time when the user is initially creating an account on the content server 120, responsive to a request from the user, if the preferred media features associated with the user are not associated with some threshold number of pre-existing baseline users, if there the number of baseline users that have a particular configuration of expanded demographic information that is less than a threshold number, etc. Additionally, in some embodiments, the baseline module 230 may, e.g., offer incentives to users to provide additional demographic information. Incentives may be, e.g., reduced amount of advertisements provided in the content, increased audio quality, access to additional media channels, monetary award, access to additional tools, some other incentive for a user to provide expanded demographic information, or some combination thereof. The baseline module 230 may also use third party survey data to collect demographic information about baseline and/or semi-anonymous users. In some embodiments, the baseline module 230 ensures there are at least a threshold number of baseline users with matching expanded demographic information for different configurations of the expanded demographic information.

The monitoring module 240 monitors media item preferences of users of the content server 120. The monitoring module 240 monitors, e.g., what media items have been presented to which users, which media channels are associated with each user, a seed value (e.g., name of a song or band) used to generate a media channel, express feedback (e.g., thumbs up/down of a media item, rating of a media item) from each user, other metrics which indicates particular preferences of a user for particular media items, and by implication, the media features of the media items. The monitored media item preferences may be for both baseline users and semi-anonymous users.

The deconstruction module 250 deconstructs the monitored media preferences of the users (both semi-anonymous and baseline) into sets of preferred media features for those users. For a given user, the deconstruction module 250 identifies the media items presented to the user and any feedback received from the user with respect to the media items. In some embodiments, the deconstruction module 250 may also identify seed values that were used to generate the media channels associated with the identified media items. In one embodiment, the deconstruction module represents the received feedback as a score (i.e., a feedback score) for each media item. For example, the feedback score can be a numeric value −1 and 1 that represents the sentiment and magnitude of the user's feedback for the media item, with a −1 indicating a strong dislike and a 1 indicate a strong like. The feedback score for a particular media item may be based on, e.g., a number of times the media item was presented to the user, the number of times the user provided express positive or negative feedback for the media item, etc.

The deconstruction module 250 deconstructs all or a subset of the media items presented to the user into sets of musicological features that describe the media items. For example, a given song is deconstructed into the set of musicological features that describe the song. The deconstruction module 250 applies the feedback for the media items to the musicological features of the items (i.e., the feedback score for a song is applied to the features of the song). The individual musicological features, and the features' associated feedback scores, are then aggregated such that the media preferences of the user are represented as a set of individual features with associated scores representing the user's likes and dislikes. For example, the deconstruction module 250 may, through this process, determine that a particular user prefers media items with electronic influences, a subtle use of vocal harmony, and major key tonality. Likewise, the deconstruction module 250 may determine that the user dislikes features including basic rock song structures and minor key tonality.

The correlation module 260 learns correlations between the demographic information associated with the baseline users and the deconstructed monitored media preferences associated with those users. In some embodiments, the correlation module 260 uses machine learning techniques to identify relationships between demographic information of baseline users and media feature preferences of those users. The machine learning may produce weights indicating strength of association between the demographic information and the media feature preferences. In some embodiments, machine learning may include statistical analysis techniques to facilitate identification of relationships between demographic information of baseline users and media feature preferences of those users. The correlation module 260 stores the learned correlations as baseline information. Using the classical music example above, the correlation module 260 may store learned correlations indicating that baseline users who are males of a certain age living in the southern U.S. and having annual income within a specified range (with income being part of the expanded set of demographic information) tend to prefer media items having a singing, mellifluous aesthetic, a subdued, expressive aesthetic, a well-known composer and a romantic-era style (i.e., musicological features of a certain type of classical music).

The inference module 270 infers profile information for the semi-anonymous users using the learned correlations between demographic information of baseline users and media feature preferences. The inference module 270 uses the learned relationships between demographic information and media feature preferences, in combination with the known demographic information of a semi-anonymous user, to infer demographic information about the semi-anonymous user that is missing from the semi-anonymous user's partial user profile. The inference module 270 adds this inferred information to the user's profile. For example, the inference module 270 may recognize that the user prefers media items with musicological features of a particular type of classical music, that the user lives in the southern U.S. and is male. Therefore, the inference module 270 may infer that the user has an annual income within the specified range mentioned above and augment the user profile of the semi-anonymous user with the inferred income information.

The content selection module 280 selects content to provide to client devices 100. The content selection module 280 receives a request for content from a client device 100 associated with a semi-anonymous user or a baseline user. The request for content includes an identifier for a media channel (e.g., a media item playlist). The content selection module 280 provides media items associated with the media channel to the requesting client device 100.

The content selection module 280 identifies opportunities to provide advertisements to the client devices 100. For example, the content selection module 280 may identify a slot for an advertisement in the content stream being provided to the client device 100. In one embodiment, the content selection module 280 may additionally identify one or more slots for advertisements that are presented outside of the provided content, such as display image advertisements presented visually on screens of client devices 100, rather than audio advertisements inserted into audio content.

The content selection module 280 retrieves demographic information from the user profile associated with the user of the client device 100. In embodiments where the user is a semi-anonymous user, the content selection module 280 retrieves a partial user profile that includes inferred profile information. In embodiments, where the user is a baseline user, the content selection module 280 retrieves an expanded user profile associated with the baseline user. The content selection module 280 extracts demographic information from the retrieved partial user profile or the retrieved expanded user profile. In embodiments, where demographic information is retrieved from a partial user profile, the retrieved demographic information includes some portion of the inferred profile information.

The content selection module 280 uses the retrieved demographic information to select one or more candidate advertisements from a pool of candidate advertisements. The content selection module 280 compares the retrieved demographic information to the targeting information of the candidate advertisements. The content selection module 280 selects one or more candidate advertisements from the pool of candidate advertisements that have a threshold percentage of targeting criteria that matches the retrieved demographic information. Additionally, in some embodiments, the content selection module 280 may use other factors to select an advertisement from the one or more candidate advertisements. Other factors may include, e.g., an advertisement mix model of the content server 120, which specifies the order in which advertisements with different properties (e.g., from different advertisers, with different subject matter) should be provided so as to maximize user interest; any advertising auction factors, such as bid price and/or preferring advertisements for which the advertisers are willing to pay higher per-impression fees. The selected advertisement is provided to the advertisement server module 290.

The advertisement server module 290 may provide the selected advertisement to the client device 100. In embodiments in which the content is streaming audio, for example, the advertisement server module 290 inserts advertisements into the content stream provided to the client device 100. In alternate embodiments, the advertisement server module 290 provides the selected advertisement to the advertisement server 130.

Figure 3:
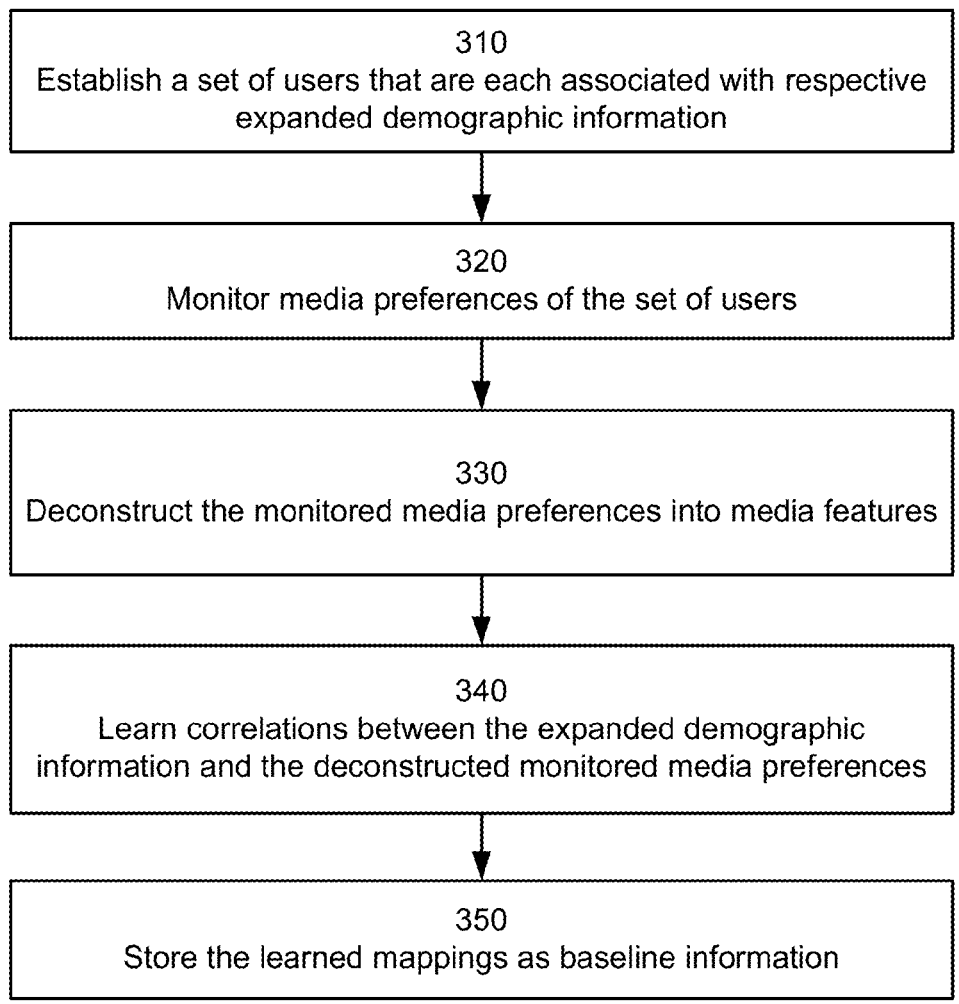
FIG. 3 is a flowchart illustrating a process of determining baseline information according to one embodiment.

FIG. 3 is a flowchart illustrating a process of determining baseline information according to one embodiment. In one embodiment, the process of FIG. 3 is performed by the content server 120. Other entities may perform some or all of the steps of the process in other embodiments. Likewise, embodiments may include different and/or additional steps, or perform the steps in different orders.

The content server 120 establishes 310 a set of users that are each associated with respective expanded demographic information. The content server 320 obtains at least a threshold number of baseline users with same or similar expanded demographic information for many different configurations of expanded demographic information. A large number of users with the same or similar demographic information helps increase the accuracy of what media features are preferred by users having the same or similar demographic information. Additionally, by having a large number of users for each of the configurations of demographic information facilitates the content server 120 to having a set of users associated with a broad spectrum of different demographic information. The content server 320 may build the set of baseline users by e.g., querying the users, offering incentives to user, etc.

The content server 120 monitors 320 the media preferences of the set of users. For example, the content server 120 may monitor what media items are presented to each of the set of users, and/or what, if any, feedback is received from each of the set of users. The content server 120 thus learns what media items are liked and/or disliked by each user.

The content server 120 deconstructs 330 the monitored media preferences of the baseline users into sets of media features (i.e., musicological features) describing musicological characteristics of the media items liked and/or disliked by the users. The content server 120 scores the feedback provided by the users to identify media items liked or disliked by the individual users. The content server 120 deconstructs the media items into the constituent musicological features, and applies the feedback to the individual features. The content server 120 thus creates a set of musicological features for each user.

The content server 120 learns 340 correlations between the expanded demographic information of the users and the media feature preferences of the users. For example, the content server 120 may learn mapping to identify relationships between particular demographic characteristics and preferences for particular media features. The content server 120 stores 350 the learned correlations as baseline information.

Figure 4:
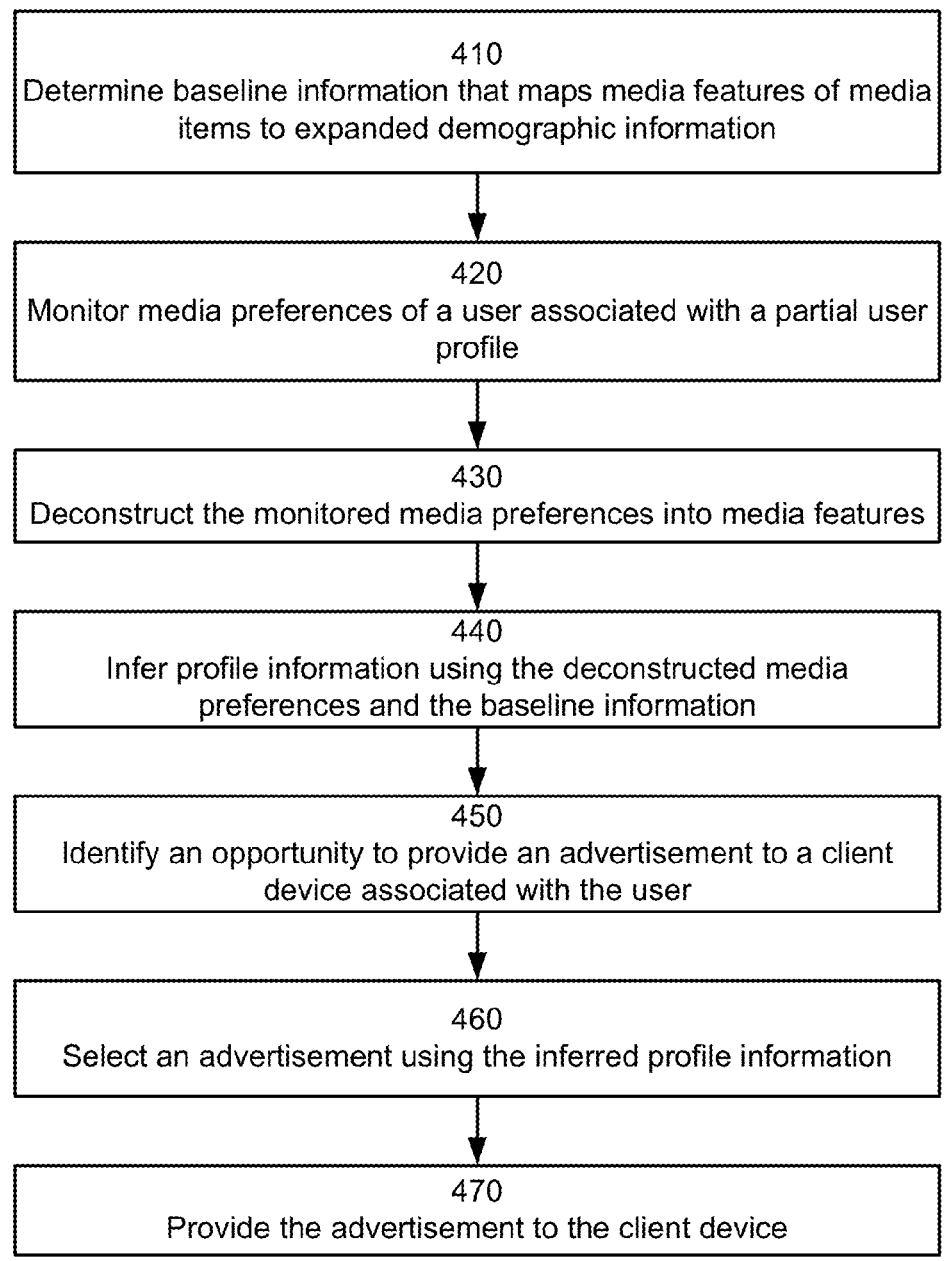
FIG. 4 is a flowchart illustrating a process of selecting an advertisement using inferred profile information according to one embodiment.

FIG. 4 is a flowchart illustrating a process of selecting an advertisement using inferred profile information according to one embodiment. In one embodiment, the process of FIG. 4 is performed by the content server 120. Other entities may perform some or all of the steps of the process in other embodiments. Likewise, embodiments may include different and/or additional steps, or perform the steps in different orders.

The content server 120 determines 410 baseline information that maps media features of media items to expanded demographic information. The content server 120 determines the baseline information using the process discussed above with regard to FIG. 3.

The content server 120 monitors 420 media preferences of a user associated with a partial user profile (i.e., a semi-anonymous user). For example, the content server 120 may monitor what media items have been presented to the user, and/or what, if any, feedback is received from the user indicating likes and/or dislikes with respect to these media items. The content server 120 deconstructs 430 these media items into constituent features, and applies the user's feedback to the features to identify the user's preferences with respect to the media features.

The content server 120 infers 440 profile information for the semi-anonymous user using the deconstructed media preferences, the baseline information, and known demographic information about the semi-anonymous user. The content server 120 uses the learned relationships between demographic information and media feature preferences within the baseline information in combination with the known demographic information of the semi-anonymous user, to infer demographic information (i.e., expanded demographic information) about the semi-anonymous user that is missing from the semi-anonymous user's partial user profile. The content server 120 augments the partial user profile with inferred profile information that is some or all of the retrieved expanded demographic information.

The content server 120 identifies 450 an opportunity to provide an advertisement to a client device 100 associated with the user. The content server 120 may, for example, identify a slot for an advertisement in the content stream being provided to the client device 100, or identify a slot for an advertisement that would be presented outside of the provided content, such as display image advertisements presented visually on screen of the client device 100.

The content server 120 selects 460 an advertisement using the inferred profile information. The content server 120 retrieves demographic information from the partial user profile that includes inferred profile information, and extracts demographic information from the retrieved partial user profile. The content server 120 uses the retrieved demographic information to select one or more candidate advertisements from a pool of candidate advertisements. The content server 120 compares the retrieved demographic information to targeting information associated with the pool of candidate advertisements, and selects one or more candidate advertisements from the pool of candidate advertisements that have a threshold percentage of targeting information that matches the retrieved demographic information. In some embodiments, the content server 120 may use other factors, as described above with reference to FIG. 2, to select an advertisement from the one or more candidate advertisements. The content server 120 provides 470 the selected advertisement to the client device 100.

Figure 5:
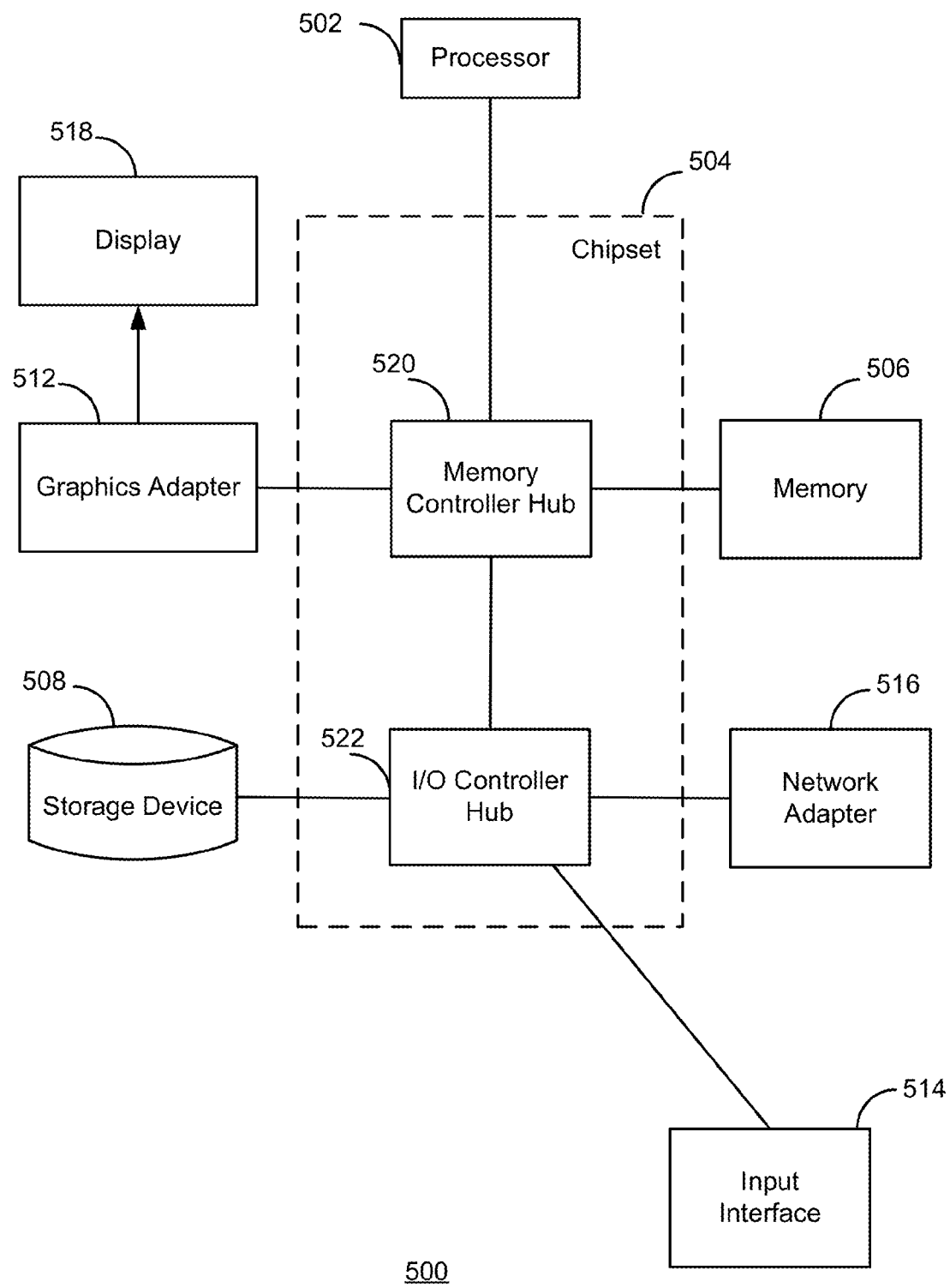
FIG. 5 is a high-level block diagram illustrating an example computer for implementing the entities shown in FIG. 1.

Turning now to a discussion of the implementation of client device 100 and/or the content server 120, FIG. 5 is a high-level block diagram illustrating an example computer 500 for implementing the entities shown in FIG. 1. The computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, an input device 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The input interface 514 is a touch-screen interface, a mouse, track ball, or other type of pointing device, a keyboard, or some combination thereof, and is used to input data into the computer 500. In some embodiments, the computer 500 may be configured to receive input (e.g., commands) from the input interface 514 via gestures from the user. The graphics adapter 512 displays images and other information on the display 518. The network adapter 516 couples the computer 500 to one or more computer networks.

The computer 500 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 508, loaded into the memory 506, and executed by the processor 502.

The types of computers 500 used by the entities of FIG. 1 can vary depending upon the embodiment and the processing power required by the entity. For example, the content server 120 can run in a single computer 500 or multiple computers 500 communicating with each other through a network such as in a server farm and/or the client device 100 may interact with one or more servers working together to provide the functionality described herein. The computers 500 can lack some of the components described above, such as graphics adapters 512, and displays 518.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, media feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for advertisement selection based on demographic information inferred from media item preferences. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for advertisement selection based on demographic information inferred from media item preferences, comprising:
    establishing a set of baseline users with baseline user profiles providing baseline demographic information about the baseline users and correlating the baseline users with preferences for musicological features of media items;
    monitoring media preferences of a user associated with a partial user profile specifying a subset of the baseline demographic information about the user;
    deconstructing the monitored media preferences to identify preferences of the user for musicological features of media items, the deconstructing comprising:
        identifying a plurality of media items associated with the monitored media preferences,
        determining a feedback score for each of the media items,
        identifying musicological features that characterize the media items using a database of features and a mapping of media items to specific musicological features, the musicological features describing underlying characteristics of the media items,
        applying the feedback scores for the media items to their respective identified musicological features, and
        aggregating the individual musicological features and the musicological features' associated feedback scores such that the media preferences of the user are represented as a set of individual musicological features with associated scores representing the user's likes and dislikes;
    determining whether the preferences of the user for musicological features of the media items are associated with a threshold number of the baseline users;
    responsive to the preferences of the user for musicological features of the media items not being associated with the threshold number of the plurality of baseline users:
        querying the user to provide the baseline demographic information, and
        adding the user to the set of baseline users responsive to receiving the queried-for baseline demographic information; and
    responsive to the preferences of the user for musicological features of the media items being associated with the threshold number of the plurality of baseline users:
        inferring profile information missing from the partial user profile responsive to the preferences of the user for musicological features of the media items and the baseline user profiles;
        selecting an advertisement using the inferred profile information, and
        providing the selected advertisement to a client device used by the user.

2. The method of claim 1, wherein inferring profile information missing from the partial user profile responsive to the preferences of the user for musicological features of the media items, comprises:
    using the learned relationships between demographic information and media feature preferences in combination with the preferences of the user for musicological features of the media items, to infer expanded demographic information about the user that is missing from the partial user profile of the user; and
    augmenting the partial user profile with the some of the retrieved expanded demographic information.

3. The method of claim 1, wherein partial demographic information about the user is selected from the group consisting of an age of the user, location of the user, and gender of the user.

4. The method of claim 1, further comprising:
    establishing a set of users that are each associated with respective expanded demographic information;
    monitoring media preferences of the set of users;
    deconstructing the monitored media preferences of the set of users into media features;
    learning correlations between the expanded demographic information and the deconstructed monitored media preferences; and
    storing the learned mappings as the baseline information.

5. The method of claim 4, wherein learning correlations between the expanded demographic information and the deconstructed monitored media preferences comprises:
    using machine learning to identify relationships between expanded demographic information of the baseline users and media feature preferences of those users; and
    storing the learned mappings as baseline information.

6. The method of claim 1, wherein selecting the advertisement using the inferred profile information comprises:
    retrieving demographic information from the partial user profile that includes the inferred profile information;
    extracting expanded demographic information from the retrieved partial user profile;
    comparing a portion of the expanded demographic information to targeting information associated with different candidate advertisements; and
    selecting a candidate advertisement that has a threshold percentage of targeting information that matches the portion of the expanded demographic information.

7. A non-transitory computer-readable storage medium storing executable computer program instructions for advertisement selection based on demographic information inferred from media item preferences, the instructions executable to perform steps comprising:
    establishing a set of baseline users with baseline user profiles providing baseline demographic information about the baseline users and correlating the baseline users with preferences for musicological features of media items;
    monitoring media preferences of a user associated with a partial user profile specifying a subset of the baseline demographic information about the user;
    deconstructing the monitored media preferences to identify preferences of the user for musicological features of media items, the deconstructing comprising:
        identifying a plurality of media items associated with the monitored media preferences,
        determining a feedback score for each of the media items,
        identifying musicological features that characterize the media items using a database of features and a mapping of media items to specific musicological features, the musicological features describing underlying characteristics of the media items,
        applying the feedback scores for the media items to their respective identified musicological features, and
        aggregating the individual musicological features and the musicological features' associated feedback scores such that the media preferences of the user are represented as a set of individual musicological features with associated scores representing the user's likes and dislikes;

determining whether the preferences of the user for musicological features of the media items are associated with a threshold number of the baseline users;
responsive to the preferences of the user for musicological features of the media items not being associated with the threshold number of the plurality of baseline users:
  querying the user to provide the baseline demographic information, and
  adding the user to the set of baseline users responsive to receiving the queried-for baseline demographic information; and
responsive to the preferences of the user for musicological features of the media items being associated with the threshold number of the plurality of baseline users:
  inferring profile information missing from the partial user profile responsive to the preferences of the user for musicological features of the media items and the baseline user profile;
  selecting an advertisement using the inferred profile information, and
  providing the selected advertisement to a client device used by the user.

8. The computer-readable medium of claim 7, wherein inferring profile information missing from the partial user profile responsive to the preferences of the user for musicological features of the media items, comprises:
  using the learned relationships between demographic information and media feature preferences in combination with the preferences of the user for musicological features of the media items, to infer expanded demographic information about the user that is missing from the partial user profile of the user; and
  augmenting the partial user profile with the some of the retrieved expanded demographic information.

9. The computer-readable medium of claim 7, wherein partial demographic information about the user is selected from the group consisting of an age of the user, location of the user, and gender of the user.

10. The computer-readable medium of claim 7, further comprising:
  establishing a set of users that are each associated with respective expanded demographic information;
  monitoring media preferences of the set of users;
  deconstructing the monitored media preferences of the set of users into media features;
  learning correlations between the expanded demographic information and the deconstructed monitored media preferences; and
  storing the learned mappings as the baseline information.

11. The computer-readable medium of claim 10, wherein learning correlations between the expanded demographic information and the deconstructed monitored media preferences comprises:
  using machine learning to identify relationships between expanded demographic information of the baseline users and media feature preferences of those users; and
  storing the learned mappings as baseline information.

12. The computer-readable medium of claim 7, wherein selecting the advertisement using the inferred profile information comprises:
  retrieving demographic information from the partial user profile that includes the inferred profile information;
  extracting expanded demographic information from the retrieved partial user profile;
  comparing a portion of the expanded demographic information to targeting information associated with different candidate advertisements; and
  selecting a candidate advertisement that has a threshold percentage of targeting information that matches the portion of the expanded demographic information.

13. A device for advertisement selection based on demographic information inferred from media item preferences, comprising:
  a processor configured to execute modules; and
  a memory storing the modules, the modules comprising:
    a baseline module configured to establish a set of baseline users with baseline user profiles providing baseline demographic information about the baseline users and correlating the baseline users with preferences for musicological features of media items;
    a monitoring module configured to monitor media preferences of a user associated with a partial user profile specifying a subset of the baseline demographic information about the user,
    a deconstruction module configured to deconstruct the monitored media preferences to identify preferences of the user for musicological features of the media items, the deconstruction module further configured to:
      identify a plurality of media items associated with the monitored media preferences,
      determine a feedback score for each of the media items,
      identify musicological features that characterize the media items using a database of features and a mapping of media items to specific musicological features, the musicological features describing underlying characteristics of the media items,
      apply the feedback scores for the media items to their respective identified musicological features, and
      aggregate the individual musicological features and the musicological features' associated feedback scores such that the media preferences of the user are represented as a set of individual musicological features with associated scores representing the user's likes and dislikes;
    wherein the baseline module is further configured to:
      determine whether the preferences of the user for musicological features of the media items are associated with a threshold number of the baseline users, and
      responsive to the preferences of the user for musicological features of the media items not being associated with the threshold number of the plurality of baseline users:
        query the user to provide the baseline demographic information, and
        add the user to the set of baseline users responsive to receiving the queried-for baseline demographic information; and
      responsive to the preferences of the user for musicological features of the media items being associated with the threshold number of the plurality of baseline users:
        an inference module configured to infer profile information missing from the partial user profile responsive to the preferences of the user for musicological features of the media items and the baseline user profiles,
        a content selection module configured to select an advertisement using the inferred profile information, and an advertisement server module configured to provide the selected advertisement to a client device used by the user.

14. The device of claim 13, wherein the inference module is further configured to:
   use the learned relationships between demographic information and media feature preferences in combination with the preferences of the user for musicological features of the media items, to infer expanded demographic information about the user that is missing from the partial user profile of the user; and
   augment the partial user profile with the some of the retrieved expanded demographic information.

15. The device of claim 13, wherein the baseline module is configured to establish a set of users that are each associated with respective expanded demographic information; and
   wherein,
      the monitoring module is further configured to monitor media preferences of the set of users,
      the deconstruction module is further configured to deconstruct the monitored media preferences of the set of users into media features,
      the correlation module is further configured to:
         learn correlations between the expanded demographic information and the deconstructed monitored media preferences; and
         store the learned mappings as the baseline information.

16. The device of claim 15, wherein the correlation module is further configured to:
   use machine learning to identify relationships between expanded demographic information of the baseline users and media feature preferences of those users; and
   store the learned mappings as baseline information.

17. The device of claim 16, wherein the advertisement selection module is further configured to:
   retrieve demographic information from the partial user profile that includes the inferred profile information;
   extract expanded demographic information from the retrieved partial user profile;
   compare a portion of the expanded demographic information to targeting information associated with different candidate advertisements; and
   select a candidate advertisement that has a threshold percentage of targeting information that matches the portion of the expanded demographic information.

* * * * *